United States Patent [19]
Melvin
[11] Patent Number: 4,763,943
[45] Date of Patent: Aug. 16, 1988

[54] CRANE HOOK

[75] Inventor: Edward Melvin, Goulds, Canada
[73] Assignee: MM & M Consultants Limited, Goulds, Canada

[21] Appl. No.: 930,563
[22] Filed: Nov. 14, 1986
[30] Foreign Application Priority Data
Nov. 21, 1985 [CA] Canada .................................. 495842
[51] Int. Cl.⁴ .............................................. B64D 17/38
[52] U.S. Cl. .................................. 294/82.13; 114/365
[58] Field of Search ................................ 114/377-380, 114/51, 301, 365; 294/66.1, 82.1, 82.18, 82.31, 82.32; 24/230.5 STP, 230.5 AD, 242; 414/139

[56] References Cited

U.S. PATENT DOCUMENTS

| | | | |
|---|---|---|---|
| 58,142 | 9/1866 | Satterly | 114/378 |
| 67,137 | 7/1867 | Raser | 294/82.32 |
| 67,989 | 8/1867 | Kempton | 294/82.32 |
| 184,701 | 11/1876 | Cosgrove | 114/377 |
| 205,402 | 6/1878 | Marcellus | 294/82.1 |
| 221,697 | 11/1879 | Newcomb | 24/242 |
| 891,598 | 6/1908 | Daly | 294/82.32 |
| 1,276,055 | 8/1918 | Groleau | 114/366 |
| 1,322,957 | 11/1919 | Rusk | 114/365 |
| 1,361,249 | 12/1920 | Giffin | 294/82.1 |
| 2,048,277 | 7/1936 | Mays | 294/82.31 |
| 2,285,590 | 6/1942 | Larson | 114/366 |
| 2,370,312 | 7/1944 | Herman . | |
| 2,509,225 | 5/1950 | Gilbert | 114/377 |
| 2,523,434 | 9/1950 | Johnson | 294/82.31 |
| 2,552,758 | 5/1951 | Andersen | 294/82.1 |
| 3,055,697 | 9/1962 | Lundskog . | |
| 3,343,189 | 9/1967 | Pollard et al. . | |
| 3,620,562 | 11/1971 | Sato | 24/242 |
| 4,065,833 | 1/1978 | Bender | 24/242 |
| 4,077,661 | 3/1978 | Inahashi | 294/82.31 |
| 4,132,387 | 1/1979 | Somerville et al. | 414/139 |
| 4,522,144 | 6/1985 | Klem | 114/378 |

FOREIGN PATENT DOCUMENTS

| | | | |
|---|---|---|---|
| 545476 | 8/1957 | Canada | 114/377 |
| 697865 | 11/1964 | Canada | 294/66.1 |
| 970417 | 7/1975 | Canada | 114/377 |
| 78930 | 1/1895 | Fed. Rep. of Germany . | |
| 2322762 | 11/1974 | Fed. Rep. of Germany . | |
| 1051482 | 12/1966 | United Kingdom . | |

*Primary Examiner*—Sherman D. Basinger
*Assistant Examiner*—Jesûs D. Sotelo
*Attorney, Agent, or Firm*—Saidman, Sterne, Kessler & Goldstein

[57] ABSTRACT

A system for retrieval and launching of lifeboats, buoys or the like includes a lifeboat provided at a point centrally above the hull, with a rigid, inverted V-shaped suspension member adapted to be engaged by a suspension hook the structure of which allows that it can be engaged with the lifting member or eye without assistance from the lifeboat itself. The hook is also provided with means for preventing inadvertant release thereof, including a downwardly directed nose portion. The engagement of the hook with the suspension member without assistance from the lifeboat is made possible by rolling bars which cause the hook to turn into engagement with the rigid lifting eye of the boat as the hook is lowered into contact therewith. When launching lifeboats or the like, a loosely suspended secondary hook, held by the main hook, holds the boat. The secondary hook is provided with a tag line which, when pulled, results in swinging the secondary hook relative to the main hook thus moving the hook away from the lifting eye of the lifeboat. In another embodiment of the hook, a scissors arrangement is provided which facilitates the release of the hook on lauching the boat, while providing, in the second mode, a rigid crane hook structure. The system presents a simple structure of the components but it enables the operation of a lifeboat retrieval and launching system without the need of any assistance at the end of the floating boat.

7 Claims, 8 Drawing Sheets

CRANE HOOK

BACKGROUND OF THE INVENTION

The present invention is related to a boat, buoy or the like raising, lowering, engaging and disengaging system. The invention is also related to different elements of such system, the elements also being useful in other fields of technology.

One of the problems encountered in raising or lowering systems for lifeboats, buoys or the like is that such systems usually require a person at the lifeboat to manipulate lifting hooks and to generally assist in the raising or launching of the boat when floating on the sea. While some of the known systems allow automatic release of the suspension hook when the boat becomes afloat, (U.S. Pat. Nos. 891,598; 221,697; 184,701 etc.) they are not capable of use in boat retrieval, unless assistance is provided by a person on the lifeboat to engage the suspension member. With these known systems, difficulties and delays may occur in raising the boat from the water. Moreover, the known systems of boat raising, lowering and engaging gear utilize relatively complex hook-on mechanical devices. They are not only expensive to produce but also pose a potential danger of failing to operate in case of extreme emergencies. The arrangement of the boat raising, lowering, engaging and disengaging gear to which reference is made above is shown, by way of an example, in Canadian Pat. No. 545,476 issued Aug. 27, 1957 and assigned to William Mills (Southerland) Limited, of Birmingham, England.

SUMMARY OF THE INVENTION

It is an object of the present invention to provide a structurally simple and reliable boat raising and lowering system which would enable the engagement of a lifting hook with a lifeboat or the like while the latter is on the sea, without the need of assistance at the boat itself, while also allowing an automatic or at least remotely controlled release of the hook when a boat is being launched. That is to say, the engagement of the lifeboat or the like with the lifting hook of the crane is to be achieved solely by manipulating elements of the system from the rescue ship, drilling rig or the like.

In general terms, the invention provides, in one aspect thereof, a boat retrieving or launching system, comprising: a lifting hook adapted to engage a suspension device of a boat when the boat is being retrieved; a secondary hook including a stem section and having a hook section at one end of the stem section, the other end of the stem section being associated with a suspending eye loosely engageable with said lifting hook; and tag line securement means disposed near the hook section at that side of the stem which is turned away from the side to which the hook section protrudes from said stem.

In another, supplemental or separate aspect of the present invention, a crane hook is provided which is adapted to become engaged with a portion of an elongate member forming a load-secured eye, said hook comprising, when in a generally upright position: a stem having an upper end and a lower end, said stem being integral with two opposed hook portions protruding from said lower end of the stem such that the stem and both hook portions are generally coincident with a first reference plane; each hook portion including a concave, load supporting section at a merger of the respective hook portion with the stem, a downwardly and inwardly sloping side section merging, at its lower end, with said load supporting section, and, at its upper end, with a normally downwardly and inwardly turned tip section; a pair of nose portions, each protruding from opposed sides of said stem in a direction towards the respective side section, each nose portion defining a normally downwardly open, concavely curved engagement surface disposed in opposed relationship with and normally above the respective load supporting section; the shape and size of the load supporting section, of the engagement surface and of the tip section being complementary with the cross-sectional configuration of the respective elongate member forming the load-secured eye.

One aspect of the present invention can also be defined, in general terms, as a crane hook adapted to become engaged with a portion of a load-secured eye, comprising, when in an upright position, a stem and two hook-shaped load supporting sections protruding from a normally lower end of the stem in opposed directions, said load supporting sections and said stem being generally coincident with a first plane, said hook further comprising a pair of hook rolling members each protruding from the stem such as to form an arcuate outer surface at opposed sides of the first plane, said hook rolling members being generally coincident with a second plane perpendicular to the first plane, each outer surface extending upwardly and away from the normally lower end portion of the stem and then gradually returning back to same at a point near the normally upper portion of said stem.

BRIEF DESCRIPTION OF THE DRAWINGS

The features of the present invention will become apparent from the following description of different aspects of the invention, by way of exemplary and preferred embodiments, with reference to the accompanying diagrammatic, not-to-scale drawings in which:

FIG. 2 is a diagrammatic perspective view similar to that of FIG. 1 but showing the boat raised to the boom of an associated crane on the rescue ship, oil drilling rig or the like;

DETAILED DESCRIPTION

Figure 1:
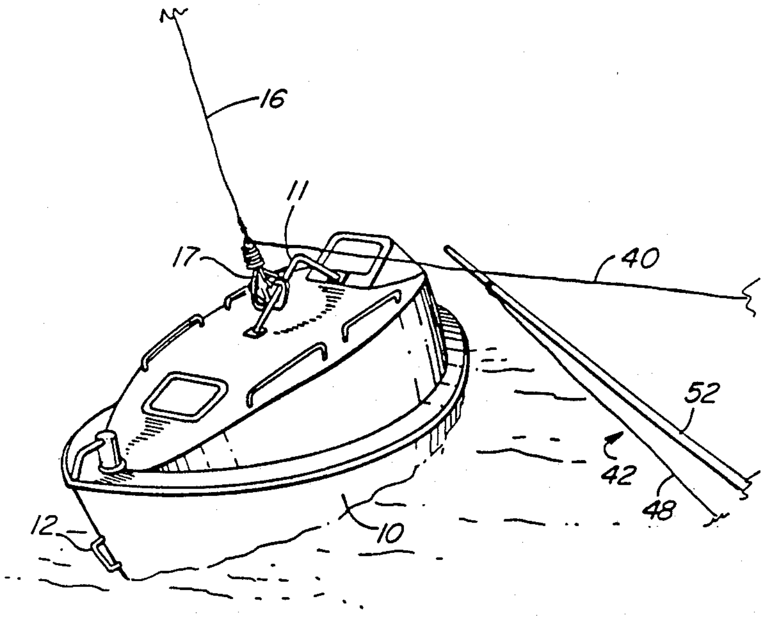
FIG. 1 is a diagrammatic perspective view of parts of the boat rising system of the present invention operating in the lifting of a lifeboat.
Figure 2:
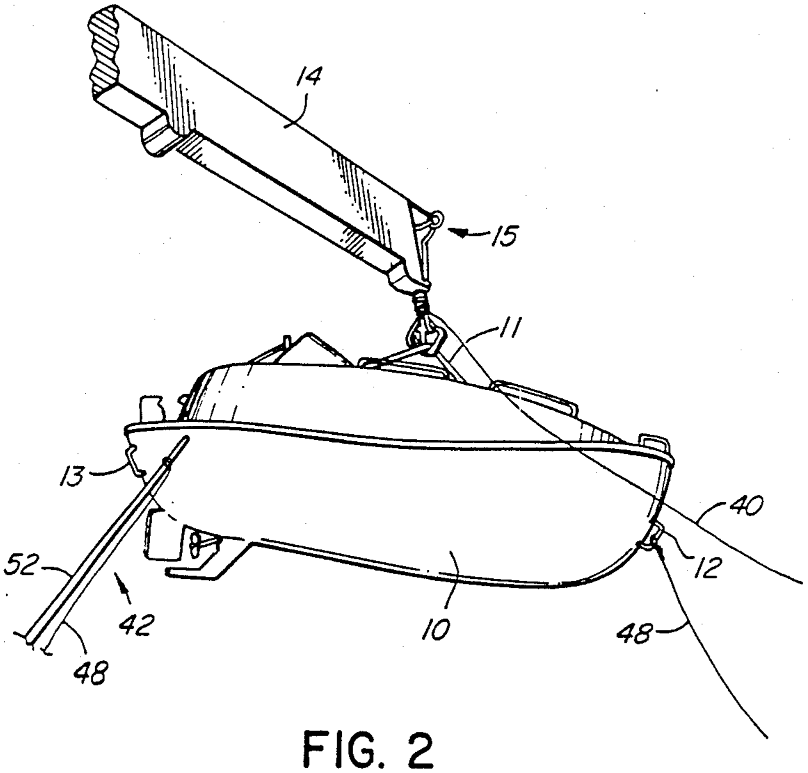
Figure 6:
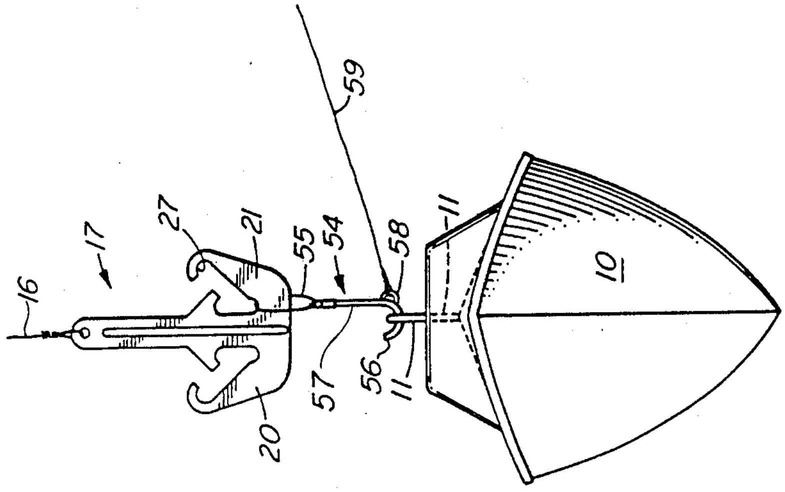
FIG. 6 shows, in a diagrammatic way, the combination of the hook shown in FIG. 4 with a secondary hook utilized in launching the lifeboat.

Reference numeral 10 denotes a lifeboat. According to one aspect of the invention, the lifeboat is provided with a lifting member or eye 11. In the embodiment of FIGS. 1, 2 and 6, the eye 11 is in fact an upper part of a tubular, V-shaped and rigidly mounted member on top of the boat 10. It is anchored to a strong part of the boat, for instance to the keel. The structural arrangement of the eye 11 shown in FIGS. 1, 2 and 6, however, was found to lack sufficient safety mainly due to the fact that its anchorage to the boat is below the water level, a potentially dangerous arrangement. The lifting member is referred to as an "eye" 11, for convenience to indicate its function in raising the boat by a crane; its shape, of course, is not the same as that of an eye in the ordinary sense of the word, e.g. the eye of the hook referred to hereinafter. Reference numeral 12 denotes another eye at the fore end of the lifeboat and reference numeral 13 (FIG. 2) denotes yet another eye welded to the boat at the aft end thereof. The lifeboat 10 is shown in FIG. 1 as having arrived near a rescue ship or the like equipped with an appropriate crane arrangement for lifting and launching lifeboats. The arrangement of the crane itself is not a part of the invention. It will therefore suffice to say that it includes a boom 14 (FIG. 2) having a sheave 15 at the free end thereof. From the sheave 15 extends a suspension cable 16 the lower end of which is secured to a hook 17 which will now be described in greater detail.

Figure 4:
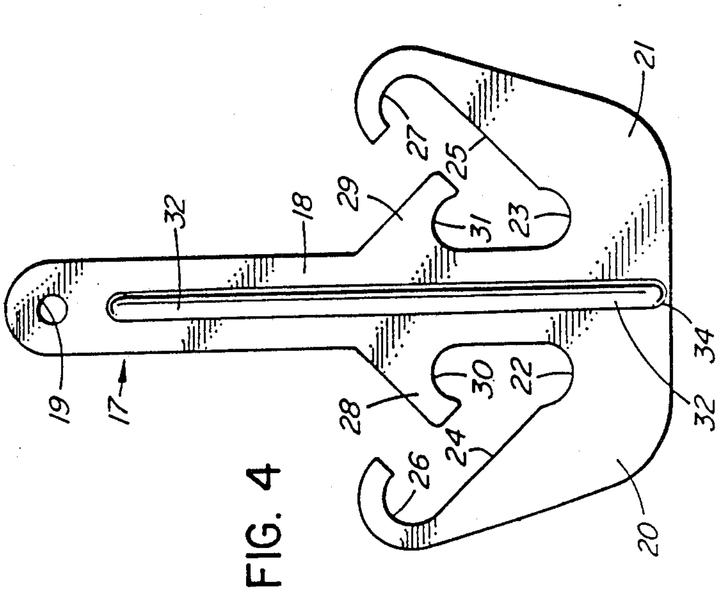
FIG. 4 shows a front view of the hook of FIG. 3.
Figure 3:
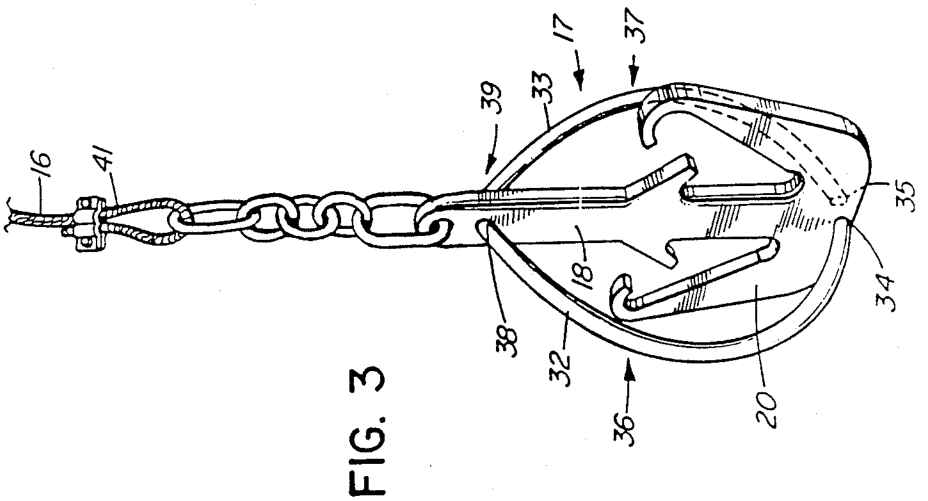
FIG. 3 shows a preferred embodiment of a boat retrieval hook in an upright position in a perspective view.

In the embodiment of FIGS. 3 and 4, the hook 17 is made of steel and includes a flat stem 18. At a normally upper end of the stem 18, a lifting eye 19 is provided. The lower end of the stem 18 merges with two opposed hook portions 20, 21. The hook portions 20, 21 and the stem 18 are coincident with a plane which, for convenience, will be referred to as "a first reference plane". Such reference plane is generally parallel in the plane of FIG. 4.

Each hook portion 20, 21 includes a concavely curved load supporting section 22, 23, respectively, which presents an upwardly open cavity at the merger of the hook portion 20, 21 with the stem 18. The hook portion 20, 21 then continues, by way of an upwardly and outwardly inclined side section 24, 25. The upward end of each side section 24, 25 terminates by way of an inwardly and downwardly turned tip section 26, 27. There is a pair of nose portions 28, 29. Each nose portion 28, 29 protrudes, in coplanar relationship with the first reference plane, away from the stem 18 and slightly downwardly to define a downwardly open, concavely curved engagement surface 30, 31 disposed just above the respective load supporting section 22, 23.

The concavely shaped load supporting sections 22, 23, the inwardly and downwardly curved tip sections 26 and 27 and the engagement surfaces 30, 31 are all of a semi-circular configuration the radius of which generally corresponds or is very slightly greater than the radius of the outer surface of the rigid eye 11. It will be appreciated that the three concave elements of each hook portion 20, 21 as described cooperate in preventing inadvertent disengagement of the rod of the eye 11 from the hook 17 due to rough seas or the like. This is critical at the beginning of the boat lifting operation since, at that point, the hook 17 may be engaged, at one moment, with the eye 11 at the load supporting section 22 or 23 while, at another moment, when the boat is raised by a wave or the like, the downwardly turned engaging surface 30 or 31 or the respective tip section 26 or 27 may be necessary to prevent the disengagement of the hook 17 from the eye 11.

In order to facilitate the engagement of the hook 17 with the eye 11, the hook 17 is provided with a pair of hook rolling members 32, 33, one protruding from each face of the stem 18. The. hook rolling members 32, 33 are arcuately shaped to provide each with an outer surface coinciding at 34 or 35 with the stem 18. The outer surface of-the members 32, 33 then extends away from the said first reference plane until it reaches the maximum distance therefrom at 36 or 37, and then again gradually returning back to the first reference plane at joinders 38, 39. It is apparent from the drawings that the hook rolling members both coincide with a second reference plane which is perpendicular to the first reference plane.

FIGS. 1 and 2 show a tag line 40 secured to an eye 41 (FIG. 3) at the lower end of the suspension cable 16. The line 40 is not shown in FIG. 3. The other end of the first tag line 40 is manipulated by a crew member on the rescue ship or rig to control the swinging of the hook 17, thus facilitating the manipulation of the hook into engagement with the eye 11 centrally above the boat 10.

When the hook 17 is engaged with the eye 11, the crane mechanism can be actuated to lift the boat 10. When the boat is being lifted, it may become necessary to prevent its pivoting about a vertical axis generally coincident with the eye 11. This can be prevented by utilizing a device for securing a tag line to the boat, which will now be described.

Figure 5:
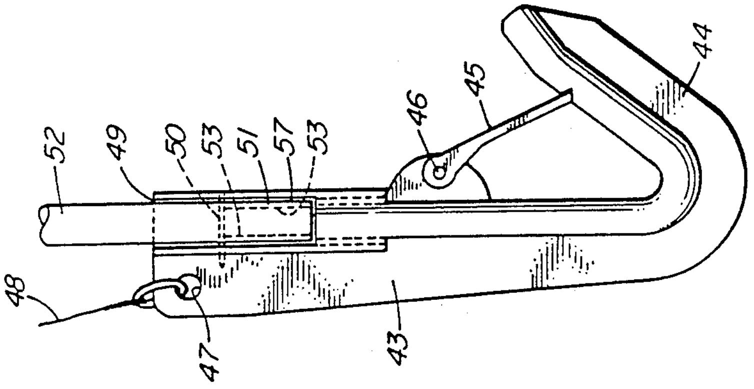
FIG. 5 shows basic features of a tag-line attachment device used in rescue operations.

Referring to FIG. 1, the device for securing the tag line to the boat is indicated by reference numeral 42. It is shown in greater detail in FIG. 5. The device comprises a snap-on hook arrangement including a hook body 43 the front end of which is integral with a hook section 44. The inside surface of the hook section 44 is engaged by a free end portion of a locking member 45 which is disposed at an angle relative to the hook section 44 and is pivotal at 46. As is well known, the locking member 45 is urged by a spring (not shown) into engagement with the hook section 44. Accordingly, if the hook is drawn over an eye such as the eye 12 or 13 on the boat 10, the locking member 45 is first urged to pivot clockwise when viewed in FIG. 5, to thus open and allow the passage of the eye 12 or 13 inside the hook section 44, whereupon the locking member 45 snaps back anticlockwise arresting the elongate member of the eye 12 or 13 inside the hook. The arrangement of the snap-on hook is very well known in different fields of technology and does not have to be described in greater detail.

The body 43 of the snap-on hook also comprises an eye 47 to which is secured one end of a second tag line 48. At the rear end of the device 42, a socket 49 is provided in which is fixedly secured a centrally and transversely arranged pin 50, approximately two inches from the opening of the socket 49. The socket is of a cylindric configuration complementary with the cylindric end portion 51 of an extension rod or handle 52. The end portion 51 of the extension rod 52 is provided with a slot 53 at its forward end such that the pin 50 may be received within the slot 53. It will be appreciated, that since the extension rod 52 is of a tubular configuration the slot 53 is provided in opposed wall sections of the tube. The slot engaging the pin 52 prevents relative pivotal movement about the axis of the socket 49 between the body 43 and the extension rod 52. The second tag line 48, if held tight at the remote end of the rod 52, prevents inadvertent withdrawal of the extension rod 52 from the socket 49, to the left of FIG. 1.

The extension rod is approximately 20 feet long which is sufficient for securing to the eyes 12, 13 of a suspended lifeboat the respective second tag line 48 by working from a rescue ship or the like.

In FIG. 2, one of the second tag lines 4S is shown already secured to the fore eye 12, the rod 52 having been removed, while the snap-on hook of the tag line 48 at the left of FIG. 2 is being manipulated, by rod 52, into engagement with the eye 13 at the aft end of the lifeboat 10. When both tag lines 48 are secured to the respective eyes 12, 13, the boat can be very easily manipulated from the ship into the appropriate position.

It will be appreciated from the above that the described elements of the lifeboat lifting device allow the engagement of appropriate elements with a lifeboat, when retrieving same, without the need of any person to be at the lifeboat to engage the hook of the lifting crane with the appropriate lifting eye of the boat, as is required in the known systems.

The present invention, however, also provides a further improvement wherein the launching of the boat is facilitated. In such case and referring only to the embodiment of FIG. 6, a secondary hook 54 is provided, the upper end of which has a suspension eye 55 the size and configuration of which is such that the eye 55 can be loosely hooked onto the hook portion 20 or 21 of the hook 17. The hook 54 has only a single hook section 56 which is relatively smooth and is devoid of any protrusions such as have been described in connection with the hook 17.

At the lower end of a stem 57 of the secondary hook 54, an eye 58 is provided to which is tied a third tag line 59.

It will be appreciated that if a lifeboat is being launched, then second tag lines 48 can be utilized to steady the boat along the launching vessel as long as the secondary hook 54 is engaged with the eye 11 such that its hook section 56 faces away from the vessel. The third tag line 59 is maintained under a slight tension. As soon as the boat reaches the surface of water and the hook section 56 becomes loose on the eye 11, a continued pull on the third tag line 59 will bring the hook 54 out of engagement with the eye 11.

A continued pull on the third tag line 59 cannot result in inadvertent removal of the secondary hook 54 from the hook 17 due to the inwardly and downwardly turned tip section 27.

Figure 8:
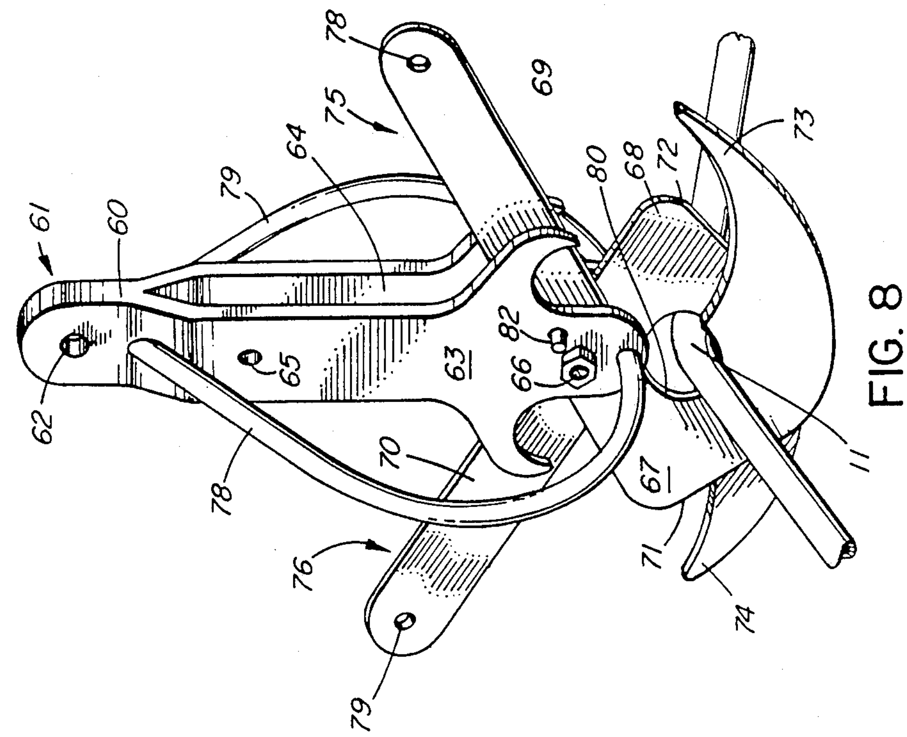
FIG. 8 is a perspective view similar to that of FIG. 7 but showing a second mode of the hook.
Figure 9:
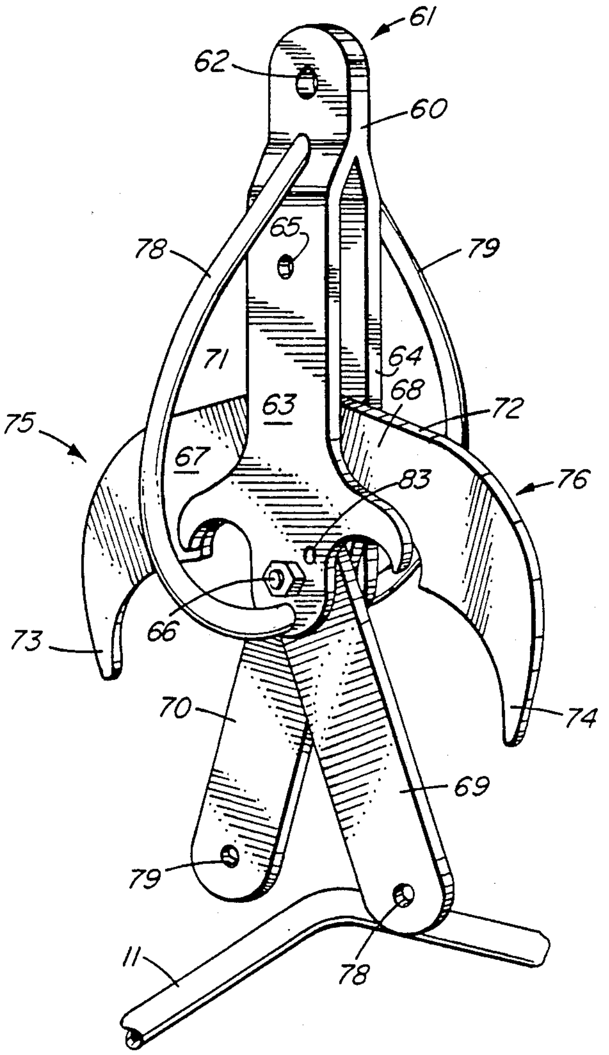
FIG. 9 is a perspective view showing the hook in a released state.

A modified version of the hook described above is shown in FIGS. 7, 8 and 9. It will now be described in detail. This is a dual purpose crane hook. FIG. 8 shows a first mode, also referred to as "self-releaseable mode". FIG. 9 shows the crane hook in a released position, acquired after a boat or the like has become lowered to the water level and FIG. 7 shows the hook in a rigid position, in which the hook is virtually equivalent in function to the hook of FIG. 3.

The hook comprises three basic elements which are pivotably secured to each other, namely a yoke 60 the upper end 61 of which is provided with a suspension eye 62 for suspending the entire assembly from a crane cable or the like. The yoke 60 has an elongated front plate 63 and an identical rear plate 64, the, two plates being connected to each other near the upper end 61 to form a general arrangement of an inverted U. Near the upper end 61, the plates 63,64 are provided with coaxial locking pin openings 65, FIG. 8. The opening 65 of the rear plate 64 is not visible in the drawings. At the normally lower end of the yoke 60, the two plates 63, 64 are provided with a pivot 66 which serves the purpose of pivotally securing to the yoke 60 two virtually identical J-shaped members 67, 68. Each J-shaped member is comprised of a stem portion 69, 70; a base portion 71, 72 and a hook portion 73, 74 which forms a continuation or extension of the respective base portion 71, 72. The J-shaped member whose stem portion 69 extends to the right of FIG. 8 is designated with reference number 75, while that whose stem portion 70 extends to the left-hand side of FIG. 8 is designated with reference number 76.

Figure 7:
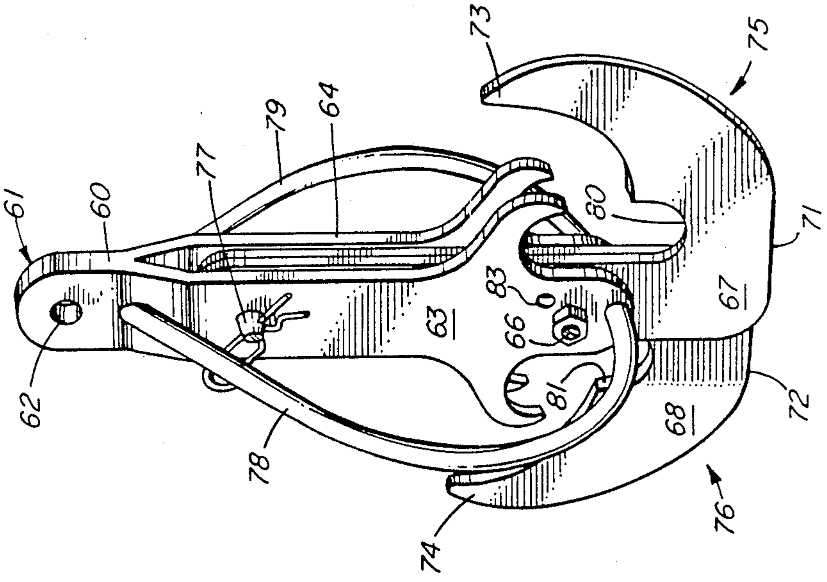
FIG. 7 is a perspective view similar to that of FIG. 3 but showing a modified embodiment of the hook.

Referring to FIG. 7, numeral 77 designates a security pin received in the pin openings 65 and passing also through passages 78, 79 at the free ends of the stem portions 69, 70. The passages 78, 79, of course, are also coaxial with the pin 77 and with openings 65, when the hook is in the rigid state of FIG. 7. The security pin 77 thus keeps the stems 69, 70 of the J-shaped members in a generally vertical position as shown in FIG. 7. The hook is ready for retrieval and is practically of the same arrangement as the hook of FIG. 3. The arched tubes 78, 79 welded to the plates 63, 64 have exactly the same purpose and operation as the rolling members 32, 33 referred to above.

To bring the hook of FIGS. 7–9 to its second, launching mode, the pin 77 is removed from the openings 65, 78, 79, and the arms 69, 70 are manipulated into the position of FIG. 8 on a ship, a helicopter, a drilling rig platform or the like so as to make the hook portions 73, 74 surround a rigid tube of the eye 11 mounted on a lifeboat or the like as shown, e.g. in FIG. 8. The arms 69, 70 are being manipulated by pivoting about pivot 66. Once the two J-shapes members 75, 76 are placed into engagement with the tube 11 with the stems 69, 70 now inclined, the crane associated with the hook is actuated to raise the hook to remove any slack from the hook suspending cable 16 and to tension the cable. This will result in suspension of the tube 11 by the concave inner parts 80, 81 of the hook portions 73, 74 of the arms 69, 70, held by the weight of the suspended object. A supplemental safety pin 82 (FIG. 8) inserted in an opening 83, FIG. 7, can be used to prevent inadvertent, accidental release. If we now assume that the crane raises the hook and with it the boat which is fixed to the tube 11, one can see that the boat is now suspended and ready to be launched. The boat is now manipulated to the side of the drilling rig platform or a ship. The supplemental pin 82 is removed as soon as there is no danger of the stems 69, 70 hitting an object. With the pin 82 removed, the boat is now lowered to the sea. As soon as it hits the surface of the sea, the suspension force at tube 11 no longer exists. The tube 11 moves upwardly relative to the yoke 60.

This results in disengagement of the tube 11 from the concave hook portions 80, 81. Due to the weight of the inclined stems 69, 70, the two J-shaped members 75, 76 are now free to pivot about the pivot point 66 to a dropped position as shown in FIG. 9. In this position, the hook portions are disengaged from and moved away from the tube 11. A subsequent lifting or raising of the yoke 60, and with it the freely pivotal J-shaped members 75, 76, results in that of the lifeboat or the like is now free of any engagement with the crane.

If it is again desired to use the hook of the present invention as a regular crane hook, for instance for retrieval of the launched boat back from the sea to the rig platform, the J-shaped members 69, 70 are manually pivoted such as to become generally coincident with the yoke as shown in FIG. 7. Upon alignment with the yoke 60, the locking pin 77 is reinserted in aligned openings 65, 78, 79 to reach the static mode described above.

It was mentioned earlier in this specification that the structural arrangement of the suspension eye 11 shown in FIGS. 1, 2 and 6 required improvement due to the fact that the eye 11 was anchored to the water craft below the water-line, which is a potentially dangerous arrangement.

The present invention also provides an improved water craft lifting frame and reference is now made to FIGS. 10, 11, 12 and 13 of the drawings.

Figure 10:
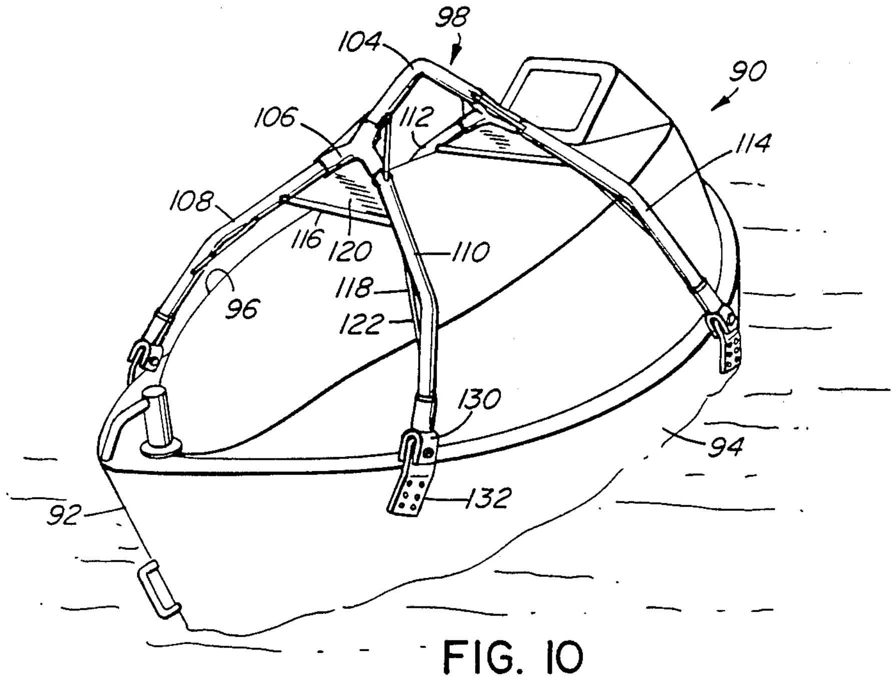
FIG. 10 is a perspective view similar to that of FIG. 1 but showing an improved version of the suspension frame of the boat.

Referring initially to FIG. 10, the water craft is again shown in the form of a lifeboat illustrated generally at 90 having a fore end 92, a port side 94 and a starboard side 96. A lifting frame comprises a triangulated tubular assembly 98 which is secured, fore and aft, to the lifeboat 90 above the water-line thereof.

Assembly 98 comprises a pair of spaced Y-socket joints 100, 102 interconnected by an apex tubular member 104. Each Y-socket joint, 100, 102 has a pair of legs 106 which receive the upper ends of assembly tubular members connected, at their other ends, to the foreand aft ends of the water craft. As shown in FIG. 10, tubular members 108, 110 connect the apex 104 to the starboard and port side respectively of the forward end of the lifeboat 90 while members 112 and 114 connect to the starboard and port sides respectively of the aft end of the lifeboat 90.

Figure 11:
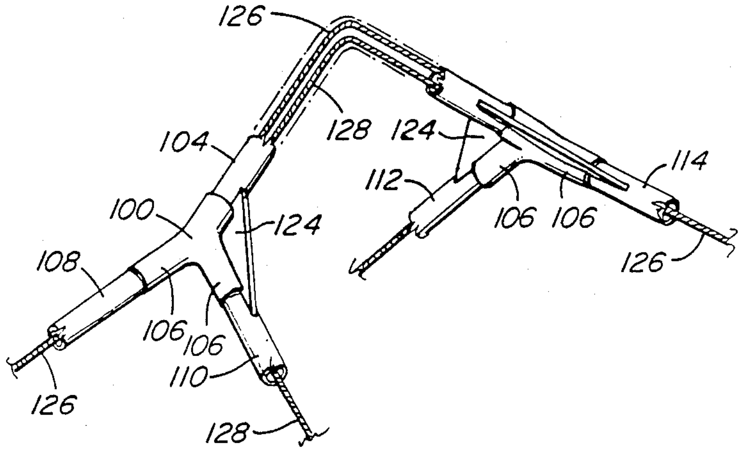
FIG. 11 is a partial perspective view, partly broken away showing certain features of the suspension frame.
Figure 12:
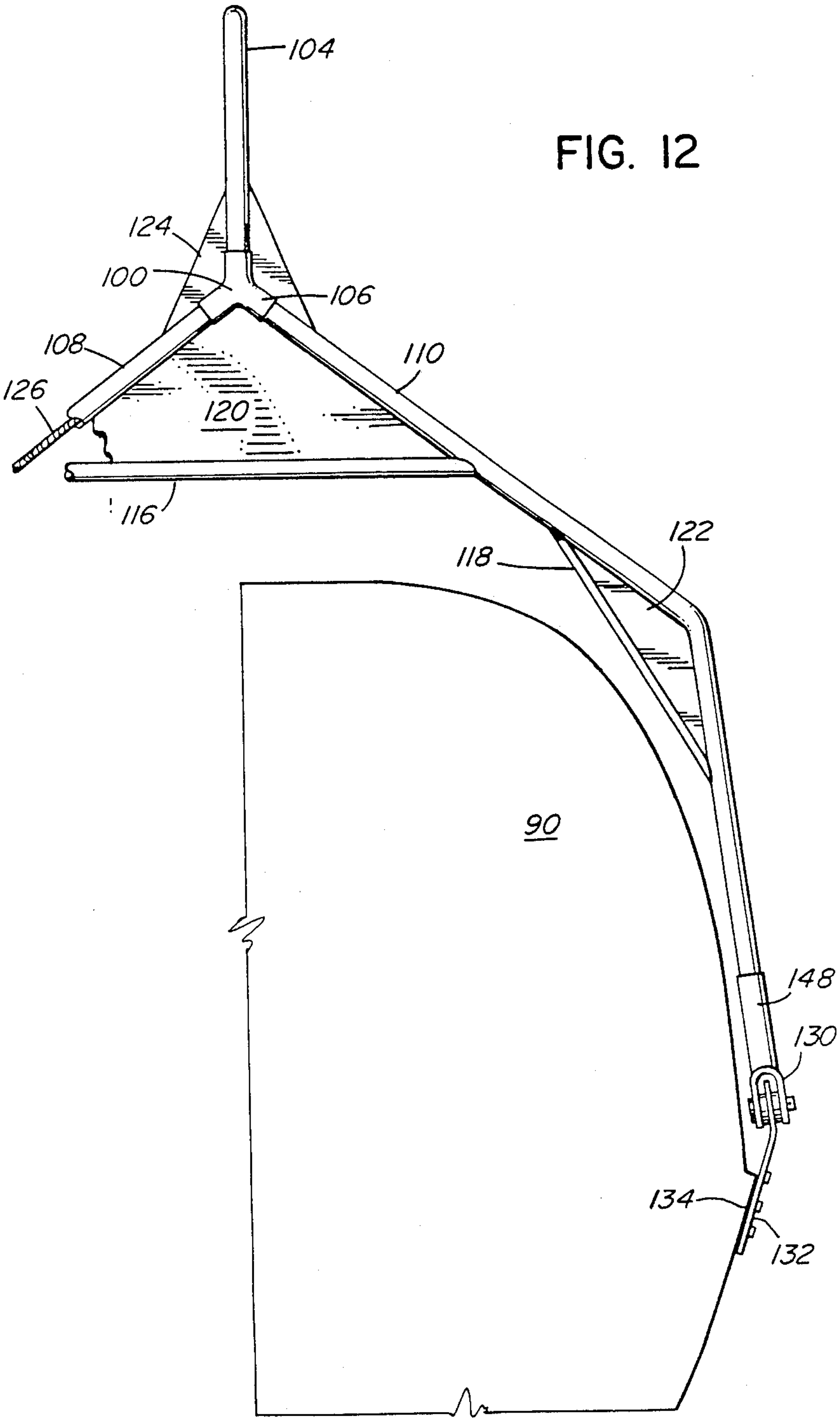
FIG. 12 is a simplified, partial end view of the frame of FIG. 10.

The assembly is suitably reinforced where necessary by further 116, 118 and associated gusset plates 120, 122 (see FIG. 12). If necessary, gusset plates 124 can be provided in the structure in the area of the Y-socket joints 100 and 102, as illustrated in FIG. 11.

Turning now to FIG. 11, the tubular members of assembly 98 enclose a pair of cables, 126 and 128 which are also anchored to the lifeboat 90 above the water-line thereof, in combination with the lower ends of the tubular members 108-114. Moreover, each cable runs diagonally from its anchorage at one end of the water craft to the other. Thus, and shown in FIG. 11, cable 126 is enclosed at the forward end of the craft 90 in tubular member 108 and is anchored therein to the forward, starboard side of the water craft. It then extends upwardly through the Y-socket joint 100, through the apex 104, through the Y-socket joint 102 and downwardly through the tubular member 114 to be anchored at the lower end thereof to the port side of the lifeboat at the aft end thereof. A similar path is taken by cable 128 from its anchorage on the port side at the forward end of the craft in tubular member 110 through to its anchorage at the lower end of the tubular member 112 in the starboard side of the water craft at the aft end thereof.

Figure 13:
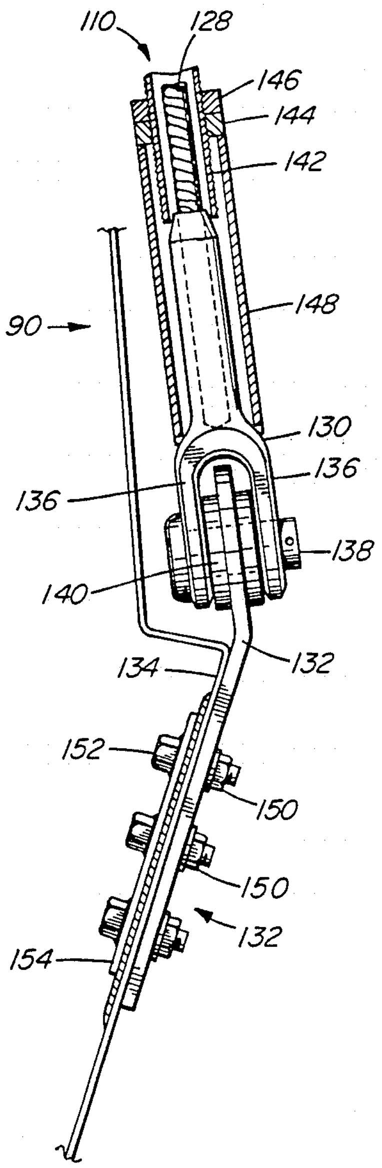
FIG. 13 is a detail showing an embodiment of a cable system reinforcing the frame of FIG. 10.

The apparatus anchoring the assembly 98 to the craft 90 is show in FIGS. 12 and 13. Referring to FIG. 12, and using tubular member 110 as an example, the lower end of that member 110 is engaged with a swage socket 130 which, in turn, is engaged with a connection plate 132 secured to the craft 90 at the gunwale area 134 thereof.

Looking at FIG. 13, the lower end of the suspension cable (in this case, cable 128) is secured in the upper end of the swage socket 130, the lower end of the socket having a pair of open, parallel plates 136 which, together with the upper end of the anchor plate 132, are drilled to receive an anchor pin 138 which serves to secure the swage socket 130 and the anchor plate 132 together. If necessary, rigid or resilient spacers 140 can be utilized between the cheeks of the upper end of the anchor plate 132 and the inside services of the legs 136 of the swage socket.

As illustrated, the lower end of tubular member 110 is threaded as at 142 to receive an adjustment nut 144 and lock nut 146 which secures the lower end of tubular member 110 to the swage socket sleeve 148.

Lastly, the lower end of the anchor plate 132 is shown secured to the gunwale area of the craft 90 by a plurality of suitable fastening means such as bolts 150, the heads 152 thereof being preferably welded to reinforcing plate 154 located on the inside of the wall of the craft.

It will be appreciated from the forgoing description of FIGS. 10 through 13 inclusive that a superior lifting frame has been provided.

While the present invention has been described in connection with specific embodiments thereof and in a specific use, various modifications of the invention will occur to those skilled in the art without departing from the spirit and scope of the invention as set forth in the attached claims.

The terms and expressions which have been employed in the specification are used as terms of description and not of limitation and there is no intention in the use of such terms and expressions to exclude and equivalence of the features shown and described or portions thereof. It is recognized that various modifications are possible within the scope of the invention as claimed.

I claim:

1. A crane hook adapted to become engaged with a portion of an elongated member forming a load-secured eye, said hook comprising, when in a generally upright position:

(a) a stem integral with two opposed hook portions protruding from a lower end thereof such that the stem and both hook portions are generally coincident with a first reference plane;

(b) each hook portion including a concave, load supporting section of a generally semi-circular configuration at a merger of the respective hook portion with a straight, normally generally vertical side portion of the stem, a downwardly and inwardly sloping side section merging, at its lower end, with said load supporting section, and, at its upper end, with a downwardly and inwardly turned tip section;

(c) a pair of nose portions, each protruding from opposed sides of said stem in a direction towards the respective side section, each nose portion defining a downwardly open, concavely curved engagement surface disposed at an upper end of the respective side portion of the stem and facing the respective load supporting section;

(d) the shape and size of the load supporting section, of the engagement surface and of the tip section being complementary with the cross-sectional configuration of the respective elongate member forming a load-secured eye.

2. A crane hook adapted to become engaged with a portion of an elongate member forming a load secured eye, said hook comprising, when in a generally upright, position:

(a) a stem integral with two opposed hook portions protruding from a lower end thereof such that the stem and both hook portions are generally coincident with a first reference plane;

(b) each hook portion including a concave, load supporting section at a merger of the respective hook portion with the stem, a downwardly and inwardly sloping side section merging, at its lower end, with said load supporting section, and, at its upper end, with a downwardly and inwardly turned tip section;

(c) a pair of nose portions, each protruding from opposed sides of said stem in a direction towards the respective side section, each nose portion defining a downwardly open, concavely curved engagement surface disposed in opposed relationship with and above the respective load supporting section;

(d) the shape and size of the load supporting section, of the engagement surface and of the tip section being complementary with the cross-sectional configuration of the respective elongate member forming a load-secured eye, (e) a pair of hook rolling members, each protruding from the step such as to form an arcuate outer surface at opposed sides of said first reference plane and defining a second reference plane perpendicular to said first reference plane, each outer surface coinciding with the hook at the lower end of the stem, then being curved away from said first reference e plane and gradually returning back to same at a point near the upper portion of the stem.

3. A crane hook adpated to become engaged with a portion of a load-secured eye, comprising, when in an upright position, a stem and two hook-shaped load supporting sections protruding from a lower end of the stem in opposed directions, said load supporting sections and said stem being generally coincident with a first plane, said hook further comprising a pair of hook rolling members each protruding from the stem such as to form an arcuate outer surface at opposed sides of the first plane, said hook rolling members being generally coincident with a second plane perpendicular to the first plane, each outer surface extending upwardly and away from the lower end portion of the stem and then gradually returning back to same at a point near the upper portion of said stem.

4. A crane hook as claimed in claim 3 in an assembly with one end of a suspension cable, further comprising a flexible first tag line secured to the assembly near the upper portion of the stem, whereby a swinging motion of the suspension cable and of the hook can be controlled by selective pulling at the tag line.

5. A crane hook as claimed in claim 3 in an assembly with one end of a suspension cable, further comprising a flexible first tag line secured to the assembly near the upper portion of the stem, whereby a swinging motion of he suspension cable and of the hook can be controlled by elective pulling at the tag line, the tag line being secured to the suspension cable.

6. A crane hook for lowering or raising floatable objects, comprising an enlongated yoke member having spaced, parallel front and back plates;

a pair of swingable hook members pivotally connected between said plates to said yoke member, said hook members having elongated stems adapted to assume a static condition in which the stems ovelay one another between said plates, such that they are generally entirely disposed within the space defined by the contour of said plates and hook portions at the lower ends of said stems, said hook portions extending away from one another;

means on said hook portions for engaging a portions of said floatable object; and releasable locking mean between said yoke and said hook member stems for maintaining said crane hook in the static condition and which, when released, allows said hook members to swing to a first position for engaging and retaining a hooking part of said floatable object and a second position for releasing said hooking part.

7. A crane hook for lowering or raising floatable objects, comprising an elongated yoke member having spaced, parallel front and back plates;

a pair of swingable hook members pivotally connected beween said plates to said yoke member, said hook members having elongated stems adapted to assume a static condition in which the stems overlay one another between said plates such that they are generally entirely disposed within the space defined by the contour of said plates, and hook portions at the lower ends of said stems, said hook portions extending away from one another;

means on said hook portions for engaging a portion of said floatable object;

releasable locking means between said yoke and said hook member stems for maintaining said crane hook in the static condition and which, when released, allows said hook members to swing to a first position for engaging and retaining a hooking part of said floatable object and a second position for releasing said hooking part; and arched members extending outwardly from and perpendicular to said front and back plates; said arched members extending each from near the top end of said yoke to the lower end of the respective front and back plate.

* * * * *